(12) United States Patent
Liu (10) Patent No.: US 12,281,788 B2
(45) Date of Patent: Apr. 22, 2025

(54) MAGNETIC PERFUME BOTTLE DEVICE

(71) Applicant: Yingxi Liu, Rancho Cucammonga, CA (US)

(72) Inventor: Yingxi Liu, Rancho Cucammonga, CA (US)

( * ) Notice: Subject to any disclaimer, the term of this patent is extended or adjusted under 35 U.S.C. 154(b) by 0 days.

(21) Appl. No.: 18/911,598

(22) Filed: Oct. 10, 2024

(65) Prior Publication Data

US 2025/0043950 A1    Feb. 6, 2025

(51) Int. Cl.
| | | |
|---|---|---|
| A45D 34/02 | (2006.01) | |
| F21V 23/04 | (2006.01) | |
| F21V 33/00 | (2006.01) | |
| H02N 15/00 | (2006.01) | |
| A45D 34/00 | (2006.01) | |

(52) U.S. Cl.
CPC ............ *F21V 33/004* (2013.01); *A45D 34/02* (2013.01); *F21V 23/04* (2013.01); *H02N 15/00* (2013.01); *A45D 2034/002* (2013.01)

(58) Field of Classification Search
CPC .. H02N 15/00; A45D 34/02; A45D 2034/002; A45D 34/06; A47G 1/16; A47G 2001/1673; F21V 23/04; F21V 21/096; F21V 23/02; F21V 33/004; A63H 33/26
See application file for complete search history.

(56) References Cited

U.S. PATENT DOCUMENTS

| | | | | |
|---|---|---|---|---|
| 2,323,837 | A * | 7/1943 | Neal | A63F 9/14 40/426 |
| 4,585,282 | A * | 4/1986 | Bosley | F16C 32/0451 310/90.5 |
| 5,404,062 | A * | 4/1995 | Hones | H02N 15/00 310/90.5 |
| 5,638,340 | A * | 6/1997 | Schiefele | G04B 45/0053 40/485 |
| 8,258,663 | B2 * | 9/2012 | Smoot | H02N 15/00 310/90.5 |
| 8,294,542 | B2 * | 10/2012 | Wang | H02N 15/00 361/144 |
| 10,312,718 | B2 * | 6/2019 | Hahn | H02J 50/90 |
| 10,687,131 | B2 * | 6/2020 | Baek | H04R 1/025 |
| 10,931,211 | B2 * | 2/2021 | Li | H02N 15/00 |
| 11,531,158 | B2 * | 12/2022 | Iliffe-Moon | G02B 6/08 |
| 2006/0154217 | A1 * | 7/2006 | Pachler | H02N 15/00 434/131 |
| 2014/0321022 | A1 * | 10/2014 | Mori | H02N 15/00 361/144 |
| 2019/0326045 | A1 * | 10/2019 | Dudley, Jr. | H01F 7/206 |

* cited by examiner

*Primary Examiner* — Ismael Negron
(74) *Attorney, Agent, or Firm* — Daniel M. Cohn; Howard M. Cohn (57) ABSTRACT

A perfume bottle includes a perfume bottle container; a base; an electromagnet arranged in the base; a body arranged on the base; a lower decorative cover; a magnet embedded at the bottom of the lower decorative cover; and an upper decorative cover. The perfume bottle container is removably arranged in the lower decorative cover. The upper decorative cover is removably arranged on the top of perfume bottle container. The magnetic pole of the magnet is opposite to the magnetic pole of the electromagnet.

1 Claim, 8 Drawing Sheets

MAGNETIC PERFUME BOTTLE DEVICE

TECHNICAL FIELD

The invention relates to the technical field of makeup lamps, in particular to a makeup lamp with a perfume bottle.

BACKGROUND ART

The makeup lamp is a special lighting device for a dresser. It has a soft and uniform light, and can provide users with a convenient makeup experience. The makeup lamp has good lighting effect, and can accurately restore the external light, help the users identify facial defects more accurately, and make the makeup effect more natural. At night or in low light, the makeup lamp can effectively avoid eye fatigue and blurred eyes, and ensure higher makeup quality.

The existing makeup lamps on the market have a single lighting function, and occupy space when placed on the desk top and not in use, affecting the placement of other art ornaments, and bringing serious troubles to users.

SUMMARY OF THE INVENTION

The invention provides a makeup lamp with a makeup lamp component and a perfume bottle container having a magnet above a base having an electromagnet arranged inside the base. The perfume bottle container comprises a lower decorative cover, an upper decorative cover, and a perfume bottle body removably arranged inside the lower decorative cover, with the upper decorative cover arranged on the top of the perfume bottle body, and the magnetic pole of the magnet is the same as that opposite to the electromagnet. A magnetic switch electrically connected to the makeup lamp body is arranged inside the base, and is used to activate the electromagnet, control the lighting of the makeup lamp body, and switch colors.

In one embodiment of the invention, the makeup lamp body is heart, circular or rectangular shape, the bottom diameter of the lower decorative cover is greater than the top diameter to form a conical shape and the upper decorative cover is cylindrical.

In another embodiment of the invention, a lower cover lining is arranged inside the lower decorative cover, and an upper cover lining is arranged inside the upper decorative cover.

In another embodiment of the invention, arranged inside the lower cover lining is a convex ring, and a plurality of protrusions are located under the convex ring.

In another embodiment of the invention, the perfume bottle body comprises an inner bottle, an inner bottle intermediate sleeve arranged on the top of the inner bottle, and a spray head arranged inside the inner bottle intermediate sleeve, and a convex ring clamped with the protrusions is arranged outside the inner bottle.

In another embodiment of the invention, a limit ring is arranged outside the inner bottle intermediate sleeve, and an avoidance groove sleeved with the limit ring is arranged at the opposite ends of the lower decorative cover and the upper decorative cover.

In another embodiment of the invention, a lower cover mounting slot is arranged outside the lower decorative cover, a lower cover decorative sleeve is nested inside the lower cover mounting slot, an avoidance notch is arranged on the top of the lower cover decorative sleeve, and a decorative part nested with the avoidance notch is arranged outside the lower decorative cover.

In another embodiment of the invention, an upper cover mounting slot is arranged outside the upper decorative cover, and an upper cover decorative sleeve is nested inside the upper cover mounting slot.

In another embodiment of the invention, a magnet rubber ring is arranged inside the lower decorative cover, the magnet is sleeved inside the magnet rubber ring, a decorative pad maintaining a uniform horizontal height with the lower decorative cover is arranged at the bottom of the magnet, and the decorative pad, the lower cover decorative sleeve and the upper cover decorative sleeve are made from one of leather, wood, and plastic.

In another embodiment of the invention, a wire with one end extending to the outside of the base is arranged on the magnetic switch.

Compared with the prior art, the invention provides a makeup lamp with a perfume bottle, which has the following beneficial effects:

Compared with the makeup lamps with single function on the market, the makeup lamp with the perfume bottle is provided with the base and the perfume bottle container, and the perfume bottle container is disposed on the base; by use with makeup lamp components in different shapes, the appearance is more beautiful; the makeup lamp with the perfume bottle can be used as an art ornament, increasing the indoor style characteristics; for the use of the perfume function, the upper decorative cover is removed, and the perfume can be sprayed by pressing the spray head; the perfume bottle container can be more intuitively seen by users; when the users makeup, the makeup lamp with the perfume bottle can remind users to spray perfume to meet their requirements.

In the drawings: 1. Makeup lamp component; 11. Base; 12. Makeup lamp body; 13. Wire; 14. Magnetic switch; 2. Perfume bottle container; 21. Lower decoration cover; 211. Lower cover mounting slot; 212. Decorative part; 213. Magnet rubber ring; 22. Upper decorative cover; 221. Upper cover mounting slot; 23. Lower cover decoration cover; 231. Avoidance notch; 24. Upper cover decorative sleeve; 25. Lower cover lining; 251. Convex ring A; 252. Protrusion; 26. Upper cover lining; 27. Magnet; 271. Decorative pad; 28. Avoidance groove; 29. Perfume bottle body; 291. Inner bottle; 292. Inner bottle intermediate sleeve; 293. Spray head; 294. Convex ring B; 295. Limit ring.

DETAILED DESCRIPTION OF THE INVENTION

The following will provide a clear and complete description of the technical solutions regarding the embodiments of the present invention in conjunction with the drawings. It is obvious that the described embodiments are only a part of those of the present invention. Based on the embodiments of the present invention, all other embodiments obtained by common technicians in the art without making creative labor shall fall within the protection of the present invention.

As shown in FIG. 1 to FIG. 8, a makeup lamp with a perfume bottle comprises a makeup lamp component 1 and a perfume bottle container 2, wherein the perfume bottle container 2 is disposed in the makeup lamp component 1.

Figure 1:
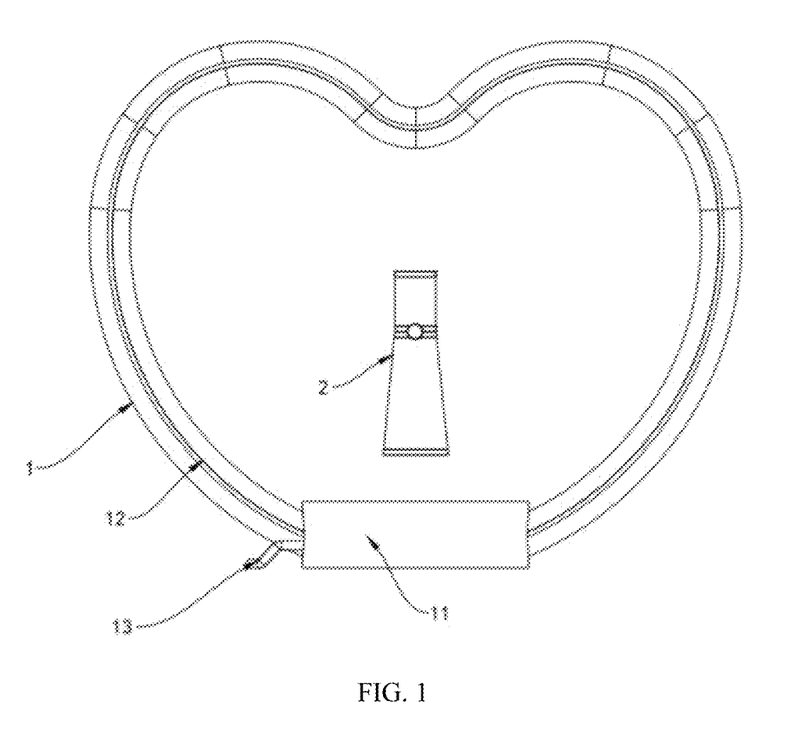
FIG. 1 is the structural diagram for a makeup lamp with a perfume bottle.
Figure 2:
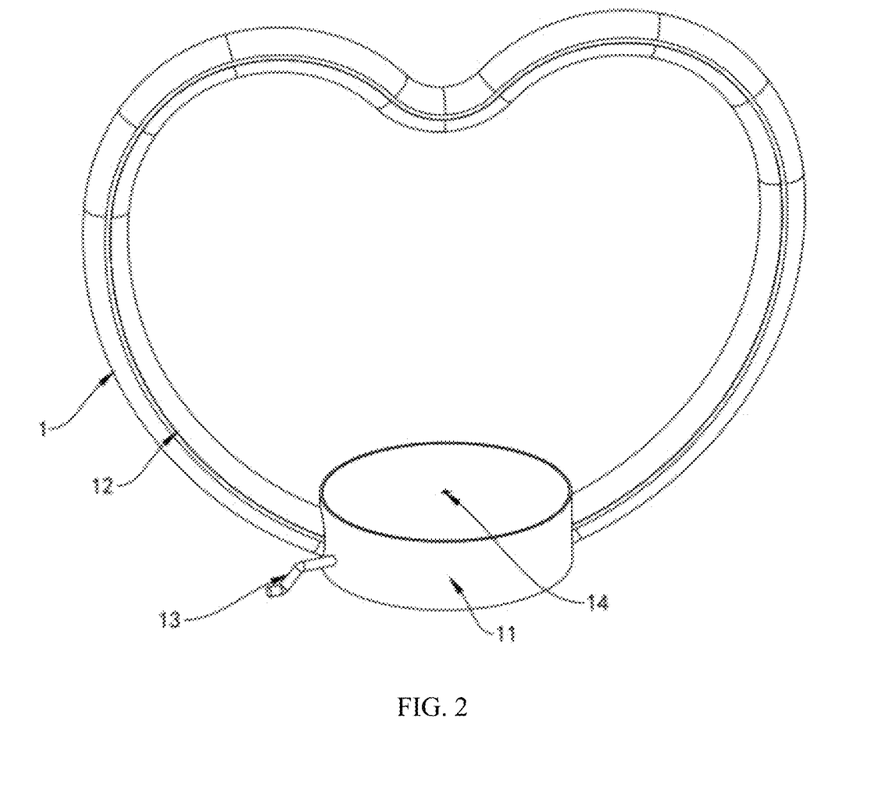
FIG. 2 is the structural diagram for a makeup lamp with a perfume bottle.
Figure 3:
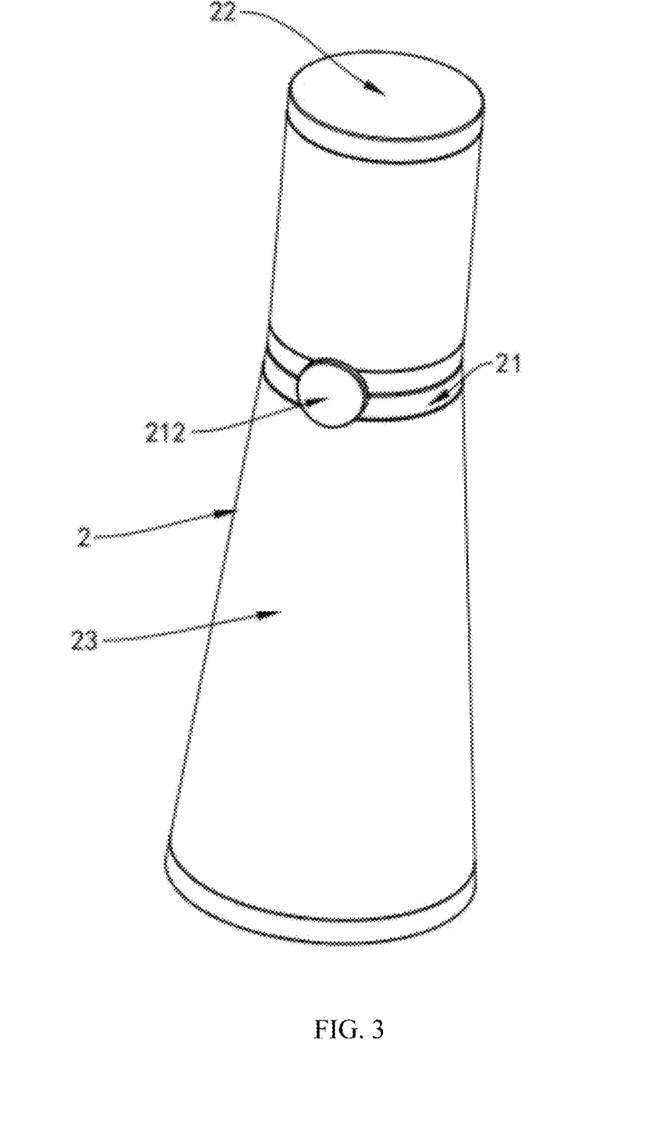
FIG. 3 is the structural diagram for a makeup lamp with a perfume bottle.
Figure 4:
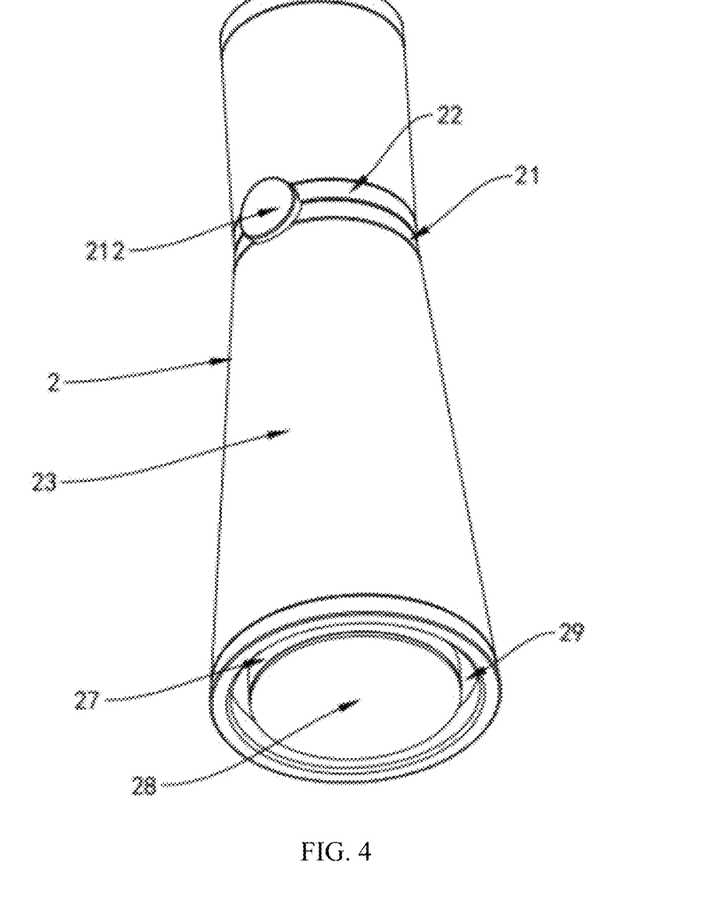
FIG. 4 is the structural diagram for a magnet of a makeup lamp with a perfume bottle.
Figure 5:
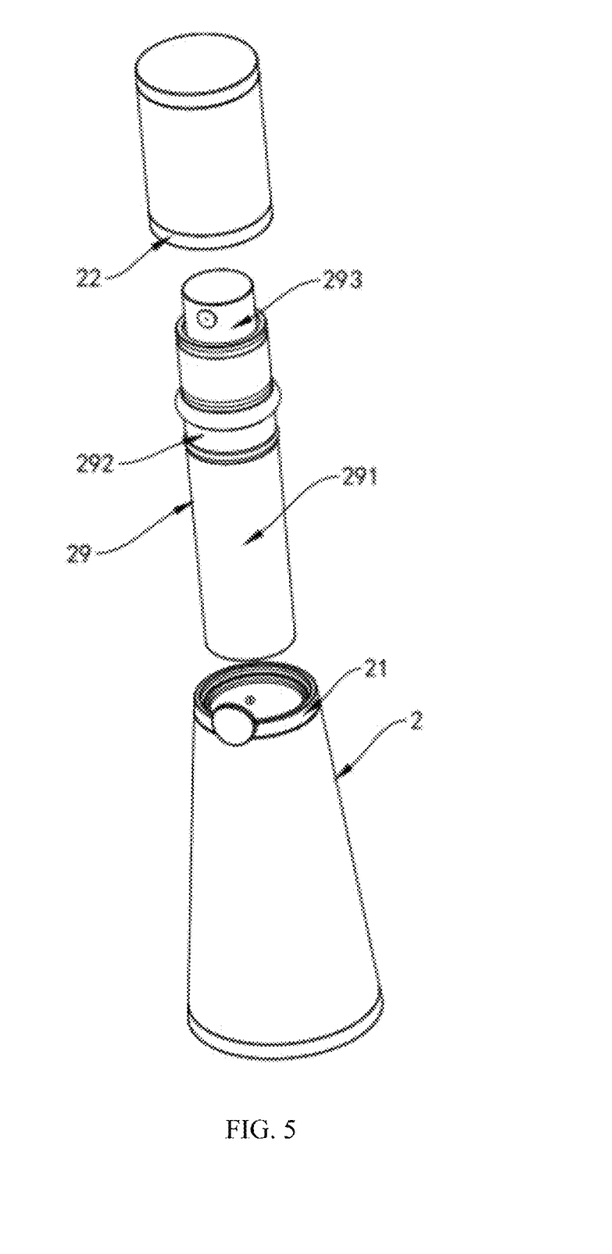
FIG. 5 is the structural diagram for a perfume bottle body of a makeup lamp with a perfume bottle.
Figure 6:
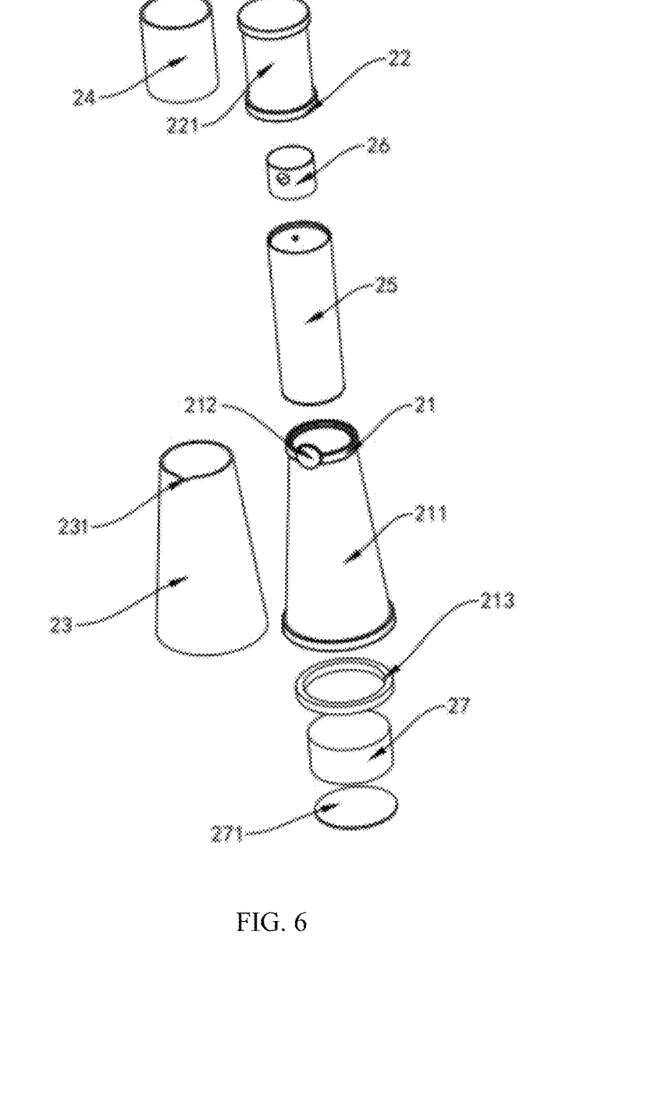
FIG. 6 is the structural explosive view for an upper decorative cover and a lower decorative cover of a makeup lamp with a perfume bottle.
Figure 7:
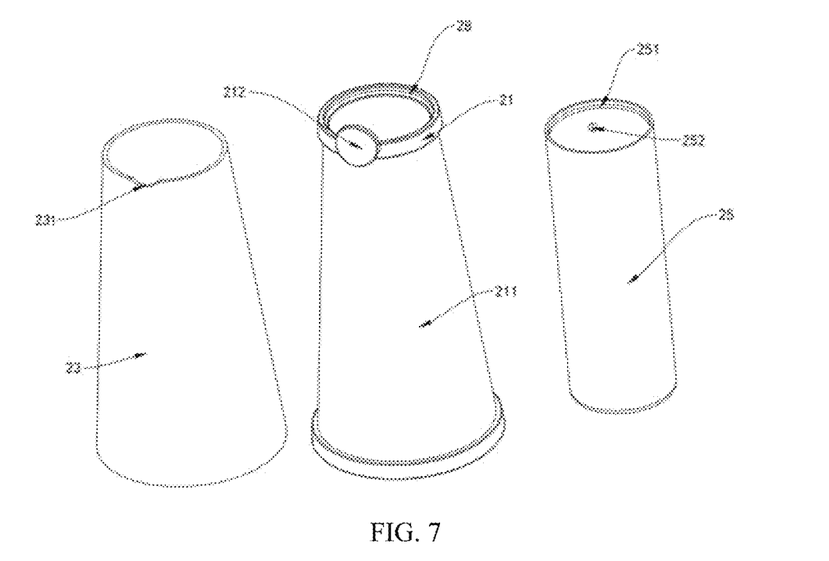
FIG. 7 is the structural diagram for a lower decorative cover of a makeup lamp with a perfume bottle.
Figure 8:
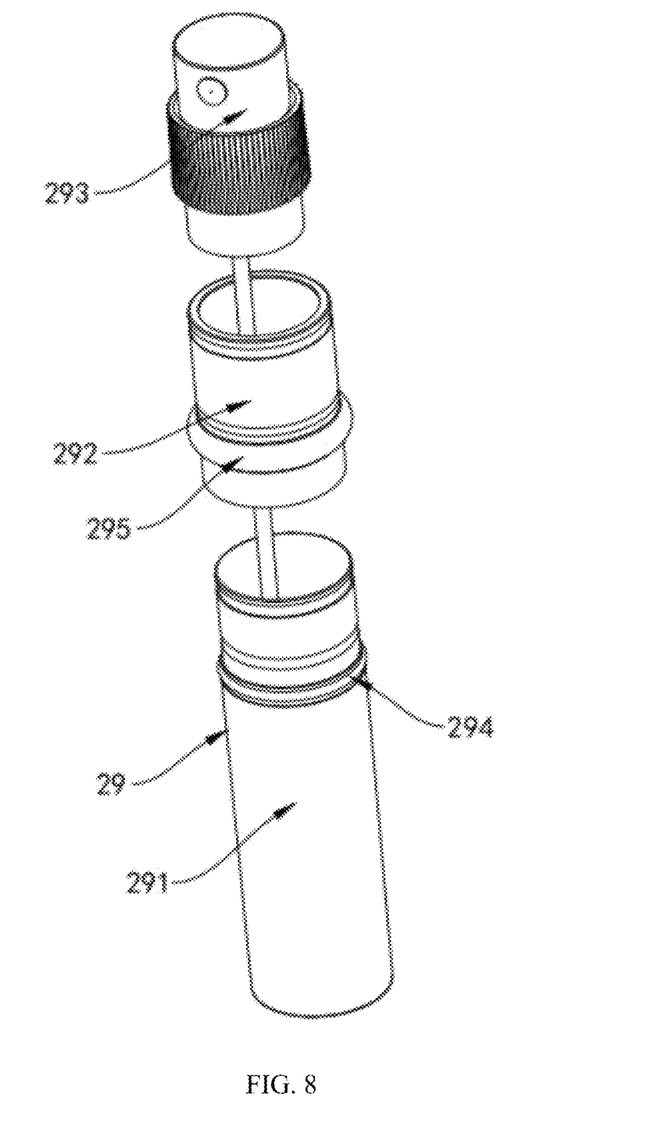
FIG. 8 is the structural explosive view for a perfume bottle body of a makeup lamp with a perfume bottle.

The makeup lamp component 1 comprises a base 11 and a makeup lamp body 12 arranged on the base 11, wherein an electromagnet is arranged inside the base 11.

The perfume bottle container 2 comprises a lower decorative cover 21, an upper decorative cover 22 and a perfume bottle body 29, wherein the perfume bottle body 29 is movably arranged inside the lower decorative cover 21, the upper decorative cover 22 is movably arranged on the top of the perfume bottle body 29, and a magnet 27 is embedded at the bottom of the lower decorative cover 21, and the magnetic pole of the magnet 27 is the same as that opposite to the electromagnet. Compared with the makeup lamps with single function on the market, the makeup lamp with the perfume bottle is provided with the base 11 and the perfume bottle container 2, and the perfume bottle container 2 is disposed on the base 11; by use with the makeup lamp components 1 in different shapes, the appearance is more beautiful; the makeup lamp with the perfume bottle can be used as an art ornament, increasing the indoor style features; for the use of the perfume function, the upper decorative cover 22 is removed, and the perfume can be sprayed by pressing the spray head 293; the perfume bottle container 2 can be more intuitively seen by users; when the users makeup, the makeup lamp with the perfume bottle can remind users to spray perfume to meet their requirements.

A magnetic switch 14 electrically connected to the makeup lamp body 12 is arranged inside the base 11, and is used to induce the magnetic field signal changes of the magnet 27 and the electromagnet, control the lighting of the makeup lamp body 12 and switch colors.

The principle of the base 11 and the magnet 27 is as follows: After being energized, the electromagnet generates the magnetic field; when the magnet 27 is close to the magnetic field, the conductive material or magnetic material in the magnet 27 will generate induced current by electromagnetic induction; the induced current will form a new magnetic field around the magnet; the new magnetic field interacts with the magnetic field generated by the electromagnet, resulting in repulsion or attraction; the current, direction and frequency of the electromagnet are precisely regulated through the control circuit, so that the magnetic force generated by such interaction can be balanced with the gravity of the magnet 27 and the perfume bottle container 2 to achieve suspension; the base 11 is also equipped with a sensor (Hall sensor) for detecting the position and state of the magnet 27 and feeding back the information to the control system in order to adjust the magnetic force in real time, ensure that the magnet 27 and the perfume bottle container 2 can be stably suspended and suspend the perfume bottle container 2; the user gently presses the perfume bottle to turn on/off the makeup lamp body 12 and control the status of the makeup lamp body 12; in the case of colored light of the makeup lamp body 12, the light is white when the user presses the perfume bottle container 2 for the first time; the light is in gradient color when the user presses the perfume bottle container 2 for the second time; the light is fixed to the current color when the user presses the perfume bottle container 2 for the third time; the light is off when the user presses the perfume bottle container 2 for the fourth time; in the case of warm yellow light, the light color is not regulated when the user presses the perfume bottle container 2.

The perfume bottle container 2 adopts the electromagnetic induction design. When being used as a gift, the product can show a magical suspension effect. The item seems to overcome gravity to be suspended in the air, with a strong visual impact and a sense of technology. Whether the makeup lamp is used as an ornament or a gift, the makeup lamp is very attractive to the eye, makes a deep impression and has unique visual effect; involving the more complex physical principle of electromagnetic induction, the makeup lamp combines science and technology with daily necessities or decorations, showing high level of science and technology and innovation ability; the makeup lamp has great attraction for people who like science and technology and are interested in scientific principles, and can stimulate people's desire to explore science and technology, and has high technological content; in the operation process, the makeup lamp generates no operation noise of the traditional mechanical device because of no mechanical contact and friction, which makes the makeup lamp can be used in various environments and cannot cause noise interference to the surrounding environment, for example, the makeup lamp is placed in the bedroom, study or office or other places to create a quiet atmosphere; when the perfume bottle container 2 is stably suspended, the energy required to maintain the suspended state is relatively low because suspension is achieved mainly by the magnetic force generated by electromagnetic induction, unlike some mechanical devices which that overcomes gravity and friction by continuous consumption of a lot of energy; the power consumption is not high after stable suspension, and energy consumption is low, so that the makeup lamp is more energy-saving; because of no contact and friction between mechanical parts, no mechanical wear exists, and the service life is relatively long, which reduces the cost and trouble of component maintenance and replacement; the stability and reliability are high during long-term use.

As a specific technical proposal of the embodiment, the makeup lamp body 12 is heart, circular or rectangular shape, the bottom diameter of the lower decorative cover 21 is greater than the top diameter thereof, the lower decorative cover 21 is conical, the upper decorative cover 22 is cylindrical, and the lower decorative cover 21 with conical design is matched with the upper decorative cover 22 with cylindrical design; as shown in FIG. 1, the makeup lamp body 12 is heart shape; when the makeup lamp body 12 is turned on, the makeup lamp can be used for supplementary lighting in makeup, or be used for live broad casting or as a lighting fixture.

As a specific technical proposal of the embodiment, a lower cover lining 25 is arranged inside the lower decorative cover 21, an upper cover lining 26 is arranged inside the upper decorative cover 22, and the upper decorative cover 22 is sleeved on the top of the perfume bottle body 29 through the upper cover lining 26; when the perfume bottle body 29 is used, the upper decorative cover 22 is removed, and the perfume can be sprayed by pressing the spray head 293.

As a specific technical proposal of the embodiment, a convex ring A 251 is arranged inside the lower cover lining 25 and a plurality of protrusions 252 are located under the convex ring A 251, the perfume bottle body 29 comprises an inner bottle 291, an inner bottle intermediate sleeve 292 arranged on the top of the inner bottle 291, and a spray head 293 arranged inside the inner bottle intermediate sleeve 292, and a convex ring B 294 clamped with the protrusions 252 is arranged outside the inner bottle 291; when the perfume bottle body 29 is loaded into the interior of the lower decorative cover 21, the convex ring A 251 and the protrusions 252 collide with the convex ring B 294 in turn, so that the convex ring B 294 moves to the bottom of the protrusions 252; when the perfume bottle body 29 is pulled up forcibly, the perfume bottle body 29 is not divorced from the lower decorative cover 21, so that the connection is more stable.

As a specific technical proposal of the embodiment, a limit ring 295 is arranged outside the inner bottle intermediate sleeve 292, and an avoidance groove 28 sleeved with the limit ring 295 is arranged at the opposite ends of the lower decorative cover 21 and the upper decorative cover 22; the limit ring 295 is arranged to limit the distance that the perfume bottle body 29 is loaded into the lower decorative cover 21, and the avoidance groove 28 is arranged to accommodate the limit ring 295.

As a specific technical proposal of the embodiment, the inner bottle intermediate sleeve 292 is connected to the inner bottle 291 through threads; when the perfume in the inner bottle 291 is used up, the perfume bottle body 29 can be removed from the inside of the lower decorative cover 21, and then the inner bottle 291 can be removed and refilled for continued use without the whole perfume bottle body 29 replaced, so that the use cost is reduced, and the user can replace the perfume with different fragrances.

As a specific technical proposal of the embodiment, a lower cover mounting slot 211 is arranged outside the lower decorative cover 21, a lower cover decorative sleeve 23 is nested inside the lower cover mounting slot 211, an avoidance notch 231 is arranged on the top of the lower cover decorative sleeve 23, a decorative part 212 nested with the avoidance notch 231 is arranged outside the lower decorative cover 21, an upper cover mounting slot 221 is arranged outside the upper decorative cover 22, an upper cover decorative sleeve 24 is nested inside the upper cover mounting slot 221, a magnet rubber ring 213 is arranged inside the lower decorative cover 21, the magnet 27 is sleeved inside the magnet rubber ring 213, a decorative pad 271 maintaining a uniform horizontal height with the lower decorative cover 21 is arranged at the bottom of the magnet 27, and the decorative pad 271, the lower cover decorative sleeve 23 and the upper cover decorative sleeve 24 are made from one of leather, wood and plastic; the decorative pad 271 is arranged to protect the bottom of the magnet 27 and reduce wear; at the same time, when being used independently and placed on the table, the perfume bottle container 2 can reduce wear and friction noise; the lower cover decorative sleeve 23 and the upper cover decorative sleeve 24 can increase the aesthetic appearance of the perfume bottle container 2, and the lower cover decorative sleeve 23 and the upper cover decorative sleeve 24 made of different materials can increase the texture of the perfume bottle container 2, and are more artistic in combination with the makeup lamp component 1.

As a specific technical proposal of the embodiment, the upper cover mounting slot 221 and the lower cover mounting slot 211 ensures the integrity of the upper cover decorative sleeve 24 and the upper cover 22 as well as the lower cover decorative sleeve 23 and the lower cover 21; the surface has no protrusions 252, which is more comfortable to hold; the decorative part 212 can be engraved with a brand logo for display; the avoidance notch 231 can further increase the stability of the lower cover decorative sleeve 23.

As a specific technical proposal of the embodiment, a wire 13 with one end extending to the outside of the electromagnetic suspension base 11 is arranged on the magnetic switch 14, one end of the wire 13 extended to the outside of the electromagnetic suspension base 11 is connected to a power supply by a plug to supply power to the makeup lamp body 12, the magnetic switch 14 and the electromagnet, and the magnetic switch 14 controls a switch of an electrical line by inducing the change of the magnetic field signal to turn on or off the makeup lamp body 12; when the perfume bottle container 2 is suspended on the electromagnetic suspension base 11, the user presses the perfume bottle container 2 so that the magnet 27 drop to get close to the electromagnet, the magnetic field between the magnet 27 and the electromagnet changes, and the magnetic switch 14 induces the magnetic field change to turn on the makeup lamp body 12. In the design, an exposed switch is not required on the base 11, so that the makeup lamp is more beautiful in appearance and can be used as an art ornament to increase the interior style features.

As a specific technical proposal of the embodiment, a screen speaker can also be installed outside the base 11, can play videos, and can be used as an alarm clock and clock in daily use, increasing the usability of the product; in addition, the design of the base 11 can make the perfume bottle container 2 suspended, other products with the magnet 27 can be suspended on the base 11, for example, an aromatherapy diffuser with the magnet 27 can be suspended to emit fragrance naturally.

As a specific technical proposal of the embodiment, a clamping slot is opened on the side of the top of the makeup lamp body 12, and a wireless charger is put in the clamping slot and can also be used for charging a smart watch.

To sum up, compared with the makeup lamps with single function on the market, the makeup lamp with the perfume bottle is provided with the base 11 and the perfume bottle container 2, and the perfume bottle container 2 is suspended on the base 11; by use with makeup lamp components in different shapes, the appearance is more beautiful; the makeup lamp with the perfume bottle can be used as an art ornament, increasing the indoor style characteristics; for the use of the perfume function, the upper decorative cover 11 is removed, and the perfume can be sprayed by pressing the spray head 293; the perfume bottle container 2 can be more intuitively seen by users; when the users makeup, the makeup lamp with the perfume bottle can remind users to spray perfume to meet their requirements.

It should be noted that the terms "comprise", "include", or any other variations thereof in this article are intended to cover non-exclusive inclusion, so that a process, method, article or device that comprises a list of elements include not only those elements but also other elements not expressly listed, or inherent to such process, method, article or device. Without further limitation, an element defined by the statement "comprising a . . . " does not exclude the presence of additional identical elements in the process, method, article, or device that comprises the element.

Although the embodiments of the invention have been shown and described, the ordinary technicians in the field can understand that various changes, modifications, substitutions and variations can be made to these embodiments within the principles and spirit of the invention. The scope of the invention is limited by the claims and their equivalent.

The invention claimed is:

1. A perfume bottle, comprising:
   a perfume bottle container;
   a base;

an electromagnet arranged inside the base;
a body arranged on the base;
a lower decorative cover;
a magnet embedded at the bottom of the lower decorative cover; and
an upper decorative cover,
wherein the perfume bottle container is removably arranged inside the lower decorative cover, the upper decorative cover is removably arranged on the top of perfume bottle container, and the magnetic pole of the magnet is opposite to the magnetic pole of the electromagnet;
wherein the lower decorative cover is conical, such that a bottom diameter is greater than a top diameter to form a conical shape;
wherein the upper decorative cover is cylindrical;
further comprising a lower cover lining arranged inside the lower decorative cover;
and an upper cover lining arranged inside the upper decorative cover;
further comprising a first convex ring arranged inside the lower cover lining; and a plurality of protrusions located under the first convex ring;
wherein the perfume bottle container comprises an inner bottle, a plurality of protrusions arranged outside the inner bottle, an inner bottle intermediate sleeve arranged on the top of the inner bottle, a spray head arranged inside the inner bottle intermediate sleeve, and a second convex ring clamped with the protrusions;
further comprising a limit ring arranged outside the inner bottle intermediate sleeve; and an avoidance groove sleeved with the limit ring and arranged at the opposite ends of the lower decorative cover and the upper decorative cover;
further comprising a lower cover mounting slot arranged outside the lower decorative cover; a lower cover decorative sleeve nested inside the lower cover mounting slot; an avoidance notch arranged on the top of the lower cover decorative sleeve; and a decorative part nested with the avoidance notch and arranged outside the lower decorative cover;
further comprising an upper cover mounting slot arranged outside the upper decorative cover; and an upper cover decorative sleeve nested inside the upper cover mounting slot;
further comprising a magnet rubber ring arranged inside the lower decorative cover, with the magnet sleeved inside the magnet rubber ring; and a decorative pad maintaining a uniform horizontal height with the lower decorative cover, and arranged at the bottom of the magnet; and
further comprising a wire with one end extending to the outside of the base.

* * * * *